United States Patent
Puma et al.

[11] Patent Number: 6,115,326
[45] Date of Patent: Sep. 5, 2000

[54] ULTRASONIC MICRO-MACHINED SELECTABLE TRANSDUCER ARRAY

[75] Inventors: Sam C. Puma, Torrance; Brian D. Brody, Studio City, both of Calif.

[73] Assignee: Integrated Medical Systems, Inc., Signal Hill, Calif.

[21] Appl. No.: 09/176,861

[22] Filed: Oct. 22, 1998

[51] Int. Cl.[7] .................................................. G01S 3/80
[52] U.S. Cl. ........................................ 367/118; 367/128
[58] Field of Search .................................. 367/128, 127, 367/118; 359/212, 224, 291

[56] References Cited

U.S. PATENT DOCUMENTS

| | | |
|---|---|---|
| Re. 30,397 | 9/1980 | King . |
| 4,160,386 | 7/1979 | Jackson et al. ............................ 73/625 |
| 4,373,781 | 2/1983 | Schlafer ............................... 350/96.29 |
| 4,463,453 | 7/1984 | Cohen ...................................... 367/135 |
| 4,509,153 | 4/1985 | Weight ...................................... 367/140 |
| 4,516,226 | 5/1985 | Peynaud et al. ......................... 367/127 |
| 4,580,251 | 4/1986 | Koukovini .............................. 367/140 |
| 4,739,860 | 4/1988 | Kobayashi et al. ..................... 181/123 |
| 4,750,584 | 6/1988 | Tanaka et al. ........................... 181/123 |
| 4,817,432 | 4/1989 | Wallace et al. ........................... 73/602 |
| 4,858,203 | 8/1989 | Hansen ..................................... 367/103 |
| 4,903,249 | 2/1990 | Hoops et al. ............................ 367/140 |
| 4,972,386 | 11/1990 | Lau ............................................. 367/99 |
| 5,026,153 | 6/1991 | Suzuki et al. ................................ 356/1 |
| 5,164,921 | 11/1992 | Graff et al. .............................. 367/140 |
| 5,165,280 | 11/1992 | Sternberg et al. ......................... 73/622 |
| 5,168,471 | 12/1992 | Parra ........................................... 367/99 |
| 5,170,283 | 12/1992 | O'Brien et al. .......................... 359/291 |
| 5,214,615 | 5/1993 | Bauer ....................................... 367/907 |
| 5,267,221 | 11/1993 | Miller et al. ............................. 367/140 |
| 5,495,427 | 2/1996 | Puma et al. .............................. 364/516 |

*Primary Examiner*—Daniel T. Pihulic
*Attorney, Agent, or Firm*—Stetina Brunda Garred & Brucker

[57] ABSTRACT

A position tracking system comprises a transmitter at a first location for producing a signal and an array of plural ultrasonic transducers at a second location arranged in a grid pattern at a plurality of respective discrete locations. The plural ultrasonic transducers are responsive to the signal to produce plural reactive signals corresponding to the signal as received at respective ones of the plural ultrasonic transducers. A computer is responsive to the reactive signals from the plural ultrasonic transducers for continuously determining the position of the array. The ultrasonic transducers are physically separated.

The ultrasonic transducers and spatial light modulators share a common backplane.

12 Claims, 3 Drawing Sheets

ULTRASONIC MICRO-MACHINED SELECTABLE TRANSDUCER ARRAY

BACKGROUND OF THE INVENTION

1. Field of the Invention

The present invention relates generally to ultrasonic tracking devices. More specifically, the invention relates to an ultrasonic wave tracking device which is digitized by the addition of a miniature microphonic array for receiving ultrasonic transmissions and a pair of transmitting micro machined transducers resulting in maximum signal resolution and minimized ambiguities.

2. Description of the Prior Art

In one form, spatial light modulators of the deformable mirror type have been made as an array of mirror elements or pixels formed on a membrane or petal structure supported on a grid in spaced relation to a corresponding array of electrodes deposited on a substrate and individually movable by the application of a local electric field as applied to each electrode to deflect the corresponding mirror element. When deflected into an appropriate pattern in accordance with the state of the applied electric signals, the collective deflection of the elements or pixels causes a phase change in the wave front of a light beam reflected from the array so that information carried in the electric signal state is encoded onto a light beam reflected by the array.

An improved spatial light modulator is disclosed in commonly assigned U.S. Pat. No. 5,170,283 to O'Brien et al. This improved modulator includes a silicon backplate having an insulating layer and a standoff grid of insulating material deposited on the backplate to define an array of cells. An electrode is deposited in each cell on said backplate. A thin membrane of doped silicon is mounted to the standoff grid and over said. array of cells and electrodes. Mirrors are laid on the membrane to create an array of reflective pixels over the array of cells. When an electrode is selectively charged the portion of the membrane overlying that cell is deflected by electrostatic attraction between the membrane and the electrode. Taken overall, a pattern is assumed by the array of pixels which corresponds to the state of the electrical signals placed on the electrodes. A vent hole formed in each cell from the electrode side of the backplate to the opposite side thereof for venting gas from the cell when said diaphragm is deflected, and grooves extend across the face of the backplate and over the cell to intersect the vent hole to assist in venting gas out of the cell and through the hole. The vent hole is preferably of a size and constructed for critical damping of the movement of the mass of the deflected diaphragm at said cell to control the movement caused by the electrostatic deflection. Flexures of reduced cross-section are formed in the diaphragm along a closed line extending around the inside perimeter of the stand off grid, so that said diaphragm moves more nearly in piston mode within the flexure.

A specific use for modulators of the type developed by O'Brien et al. may be employed in an ultrasonic tracking system of the type disclosed in commonly assigned U.S. Pat. No. 5,495,427 to Puma et al. According to the Puma et al disclosure, an array of plural ultrasonic detectors are provided at discrete locations and are responsive to an ultrasonic signal of frequency f emanating from a single remote transmitter produce respective plural electronic signals corresponding to the ultrasonic signal as received at respective ones of the plural detectors, and a processor for determining from the plural electronic signals a direction of travel of the ultrasonic signal relative to the array of ultrasonic detectors. In order to provide range, a phase shift key encoder connected to the transmitter encodes every N cycles of the ultrasonic signal with one of a succession of encoder counts, while a phase shift key decoder coupled to receive an electronic signal from one of the plural detectors produces a new decoder count every N cycles of the electronic signal that are decodable. A range processor connected to the phase shift key encoder and to the phase shift key decoder receives simultaneously the encoder counts and the decoder counts. From the encoder and decoder counts, the range processor computes a distance between the transmitter and the one detector.

It was with knowledge of the foregoing state of the technology that the present invention has been conceived and is now reduced to practice.

SUMMARY OF THE INVENTION

A position tracking system comprises a transmitter at a first location for producing a signal and an array of plural ultrasonic transducers at a second location arranged in a grid pattern at a plurality of respective discrete locations. The plural ultrasonic transducers are responsive to the signal to produce plural reactive signals corresponding to the signal as received at respective ones of the plural ultrasonic transducers. A computer is responsive to the reactive signals from the plural ultrasonic transducers for continuously determining the position of the array. The ultrasonic transducers are physically separated. Each of the ultrasonic transducers includes a mirror layer disposed on a deformable diaphragm layer. The array includes a common backplane and each of the ultrasonic transducers includes a mirror layer disposed on a deformable diaphragm layer and together mounted on the common backplane.

In short, the invention is a digital upgrade of an analog continuous wave ultrasonic tracker that requires a miniature microphone array. It is advantageous to have the microphone elements as close to one another as possible. Ideally, they should be within one wavelength of each other for maximum resolution and the prevention of ambiguities. Two of the micro-machined transducers (micro-machined pressure transducer and 4×4 silicon deformable mirror) of the type disclosed in the O'Brien et al. patent can be combined to make a new device, the micro-machined miniature microphone array of the invention. This microphone array would have multiple selectable independent patterns of microphone triads or quadrads for receiving the ultrasonic transmissions. Overall size of the microphone array might typically be approximately 6×6×4 millimeters.

A primary feature, then, of the present invention is the provision of an improved ultrasonic tracking device.

Another feature of the present invention is the provision of an ultrasonic wave tracking device which is digitized by the addition of a miniature microphonic array for receiving ultrasonic transmissions and a pair of transmitting micro machined transducer or transducers resulting in maximum signal resolution and minimized ambiguities.

Still another feature of the present invention is the provision of an ultrasonic wave tracking system which includes a transmitter at a first location for producing a signal, an array of plural ultrasonic transducers at a second location arranged in a grid pattern at a plurality of respective discrete locations, the plural ultrasonic transducers being responsive to the signal to produce plural reactive signals corresponding to the signal as received at respective ones of the plural ultrasonic transducers, and a computer responsive to the reactive signals from the plural ultrasonic transducers for continuously determining the position of the array.

A further feature of the present invention is the provision of such an ultrasonic wave tracking device in which the ultrasonic transducers are physically separated.

Yet a further feature of the present invention is the provision of such an ultrasonic wave tracking device in which the array includes a common backplane and in which an ultrasonic transducer and a spatial light modulator (SLM) are mounted on a common backplane.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
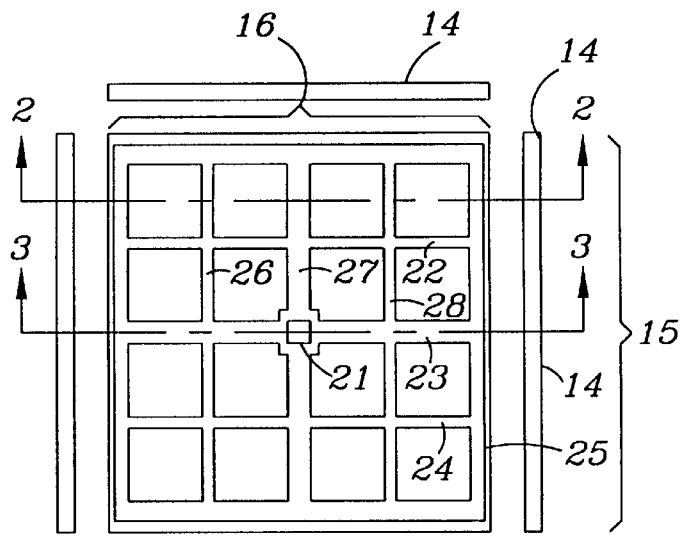
FIG. 1 is a plan view of a singe cell of a spatial light modulator or transducer which is an integral part of the present invention, and with a diaphragm removed to show the inner structure of the cell.
Figure 2:
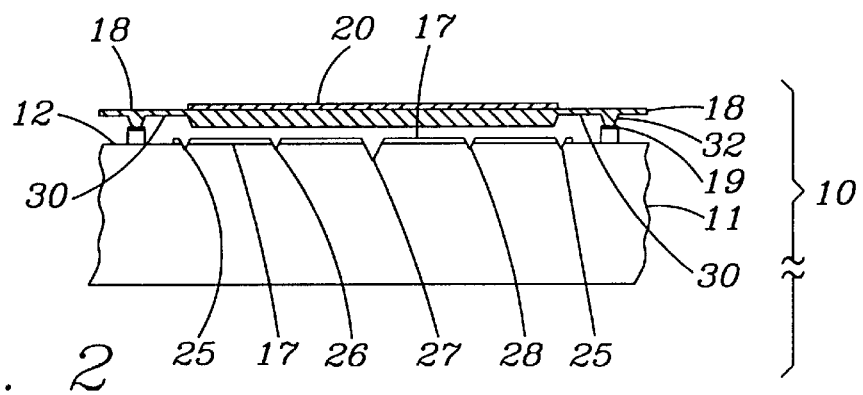
FIG. 2 is a cross sectional view taken generally along the line 2—2 in FIG. 1, with a strong back mounting plate removed.
Figure 3:
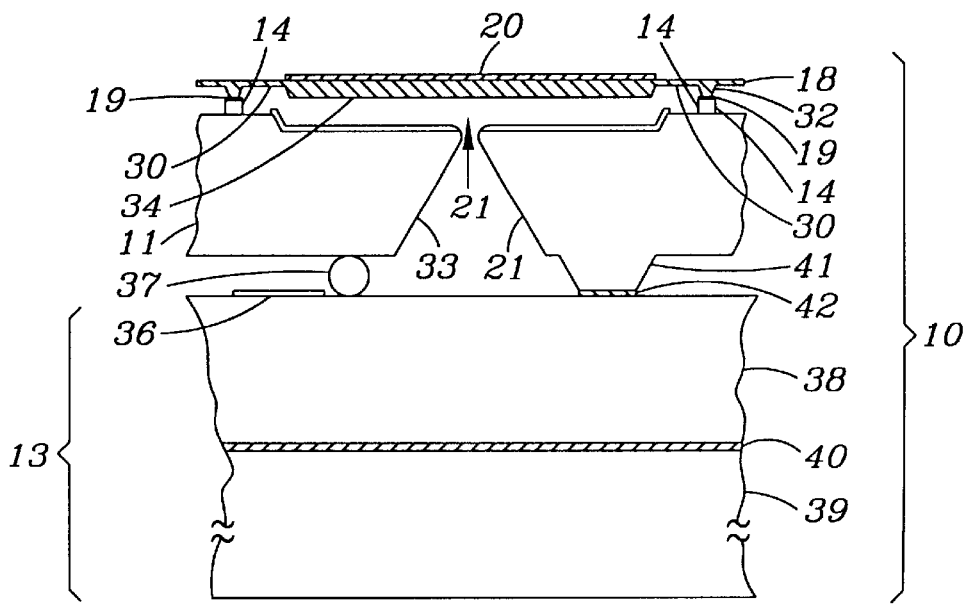
FIG. 3 is a cross sectional view taken generally along the line 3—3 in FIG. 1, as shown, with a strong back mounting plate in place.

Turn now to the drawings and, initially, to FIGS. 1, 2, and 3 which generally illustrate a spatial light modulator or transducer 10 of the type employed by the present invention. Such a spatial light transducer is disclosed in U.S. Pat. No. 5,170,283 noted above, the disclosure of which is hereby incorporated herein in its entirety.

The transducer 10 includes a silicon backplate 11 on which is formed a silicon dioxide coating insulator 12. The backplate 11 is bonded to and supported on a strong back 13 for supporting the entire device. A standoff grid 14 of insulating material such as $SiO_2$ is formed on the backplate 11 to define an array of cells, one of which, 15, is shown in detail. Each cell defines a pixel 16, which may be square, as shown. Within the area of each cell, a deflecting electrode 17 is deposited on the oxide coating 12. A doped silicon diaphragm 18 is bonded to the grid 14 by suitable means such as a bonding interface 19 made of glass. Outwardly facing mirror elements 20 are deposited on the diaphragm 18, one element 20 on each cell to define a reflective pixel therefor, or the entire outwardly facing mirror surface is coated with the reflecting material.

The backplate 11 is made from a p-type silicon wafer through which vent holes 21 are etched at a center position within each cell 15 from both the upper face and the lower face of backplate 11 creating a through hole. A plurality of grooves 22–28 are formed on the upper face of the backplate in each cell so as to intersect each other and to intersect the respective vent hole 21. Each vent hole 21 and the associated grooves 22–28 are constructed of a size to allow gas to escape from with in the cell and through the vent hole when the diaphragm element is deflected, and also provides motion damping, which may be set to a critical damping specification, for arresting motion of the diaphragm element after the applied voltage has been changed.

The diaphragm 18 is made of doped silicon so as to be sufficiently conductive to be able to be placed at reference ground potential for operation of the device, a doping level of 65 per $cm^3$ being sufficient for the purpose. The movement of the diaphragm is controlled by the electrostatic field developed between it and the cell electrode upon application of the deflection voltage, as will be described.

The diaphragm 18 is etched about the inside border of the grid around each cell 15 to provide a thin wall flexure 30 in the form of a closed curve bounded on the outside by a ridge 32 supported and bonded to the grid 14. The flexure 30 defines a central diaphragm piston area 34 of greater thickness throughout the inside of the flexure which lies in opposition to the cell electrode 17. In operation, selective charging of an electrode 17 with an electric signal attracts the diaphragm piston and causes a defection of the piston toward the electrode and backplate, the displaced air volume being vented through the vent hole 21. This avoids pressure sensitivity and also mechanically stabilizes the diaphragm motions after a change in applied signal.

The side of the diaphragm away from the backplate is provided with a reflective layer which may be chromium, or other suitable reflecting materials chosen for the wavelength of operation.

A conductor 33 extends from the electrode 17 through the respective vent hole 21 for connection to an electrical sample and hold circuit 36 which may conveniently be connected via a solder bump contact 37 between the strong-back 13 and the backplate 11.

The sample and hold circuit 36 is of conventional circuitry, such as used in the monolithic BIFET sample and hold circuit available from National Semiconductor under the designation LF-198 and which is drivable by an analog logic input XY driver (not shown) having an output from 0 to about 18 volts.

The upper portion of strong back 13 is layer 38. Layer 38 is a silicon integrated circuit containing a suitable circuit 36 for each cell and other circuits (not shown) as necessary for the XY addressable feature.

Silicon strong back 39 is bonded to the silicon layer 38 by a bond layer 40. Bond layer 40 may be a glass layer or other suitable layer to join two silicon surfaces together.

Silicon backplate 11 is etched to form contact pads 41. Bonds 42 of glass or other bonding agents bond contact pads to silicon layer 38. The purpose of the contact pads is to accurately maintain the spacing between backplate 11 and layer 38. It is possible that electrical contact can also be made with this mechanical bond, which if accomplished could replace solder bump 37.

The materials used in the construction of the transducer 10 have been carefully selected for thermal stability of the assembled device. The device is micro-machined and assembled using generally known silicon forming and bonding technology. An example of a procedure for making a spatial light transducer in accordance with the present invention will now be given.

The baseplate is formed from a p-type (boron, $10^{16}/cm^3$) 3 to 6 inch diameter silicon wafer 12 to 25 mils thick. First, the wafer is processed to etch the grooves 22–28 and the portion of vent holes 21 etched, from the top surface of backplate 11. Then the remainder of vent holes 21 are etched from the bottom surface of backplate 11. Then, a 4 micron silicon oxide layer is grown to form the standoff grid 14 followed by the field oxide layer 12 of about 5000 angstroms (0.5 microns) for electrical isolation between elements.

Afterwards, a high temperature platinum-polysilicon (Pt sintered into polycrystaline silicon to form platinum silicide) conductive electrode layer is defined to establish the conductors 33 and each of the electrodes 17. A layer of bonding glass 19 is selectively laid on the grid 14 for latter use in bonding the diaphragm to the grid. The glass is preferably 7059 (Corning) borosilicate glass, or equivalent, to match the thermal properties of silicon. Alternatively, a simple metal such as aluminum can be used in place of the platinum silicide with a lower temperature bonding glass layer such as Corning 7556.

The diaphragm is manufactured from an p-type (boron, $6^6/cm^3$) single crystal silicon wafer, 3–6 inches in diameter, on one side of which is epitaxially grown an n-type (arsenic, or phosphorus, $10^{18}/cm^3$) silicon layer having a thickness of 3 microns, which forms, with the original wafer, a PN junction which is electrically biased to form an etch stop at the junction interface, for use in a later etch process. The object of using epitaxial growth technique is to allow subsequent removal (by etching) of most of the original wafer and leave only the epitaxially grown layer supported at the peripheral edge by an annular ring of original material. The remaining carefully controlled thickness diaphragm element consists, then, solely of the epitaxially grown n-type layer, 3 microns thick supported in an annular ring.

The flexure pattern is laid out with suitable photolithography and the flexures 30 etched in the epitaxial layer to a depth of 2 microns leaving a 1 micron flexure strip forming a closed curve which will lie about the inside margin of each cell.

The diaphragm is then precisely aligned to the backplate and grid. A small vacuum is drawn through the vent holes to exert a bonding pressure between the diaphragm and the backplate and the assembly is heated to a bonding temperature of 825° C. (for bonding glass 7059) which is sufficient to fuse the glass coating to the grid and diaphragm and to create a fully bonded structure between the diaphragm and the grid.

The chromium layer is sputtered onto the entire outward facing surface of the diaphragm through a shadow mask. If needed for specific features i.e. wavelength reflection efficiency, additional metal such as silver or gold can be coated on the chromium layer. If several transducer arrays are made on a single wafer previously etched v grooves can be used as breaking patterns to separate them.

The completed device is an array of identical cells on a single wafer, each of which corresponds to that shown in FIGS. 1–3. The array can be made of various sizes, of which 16×16 and 128×128 arrays are examples. For a device with relatively few cells, e.g. 16×16 cells, it is practical to connect each deflecting electrode to an individual wire bond pad around the periphery of the device. For a device with many elements, e.g. 128×128 cells, it is not practical to have individual pads. The construction appropriate to large arrays shown in FIGS. 1–3 calls for the electrodes to pass through the vent holes to a circuit mounted to the backplate, for convenience. In this way, XY addressing techniques reduce the number of leads and use of the vent holes makes for ready access.

Figure 4:
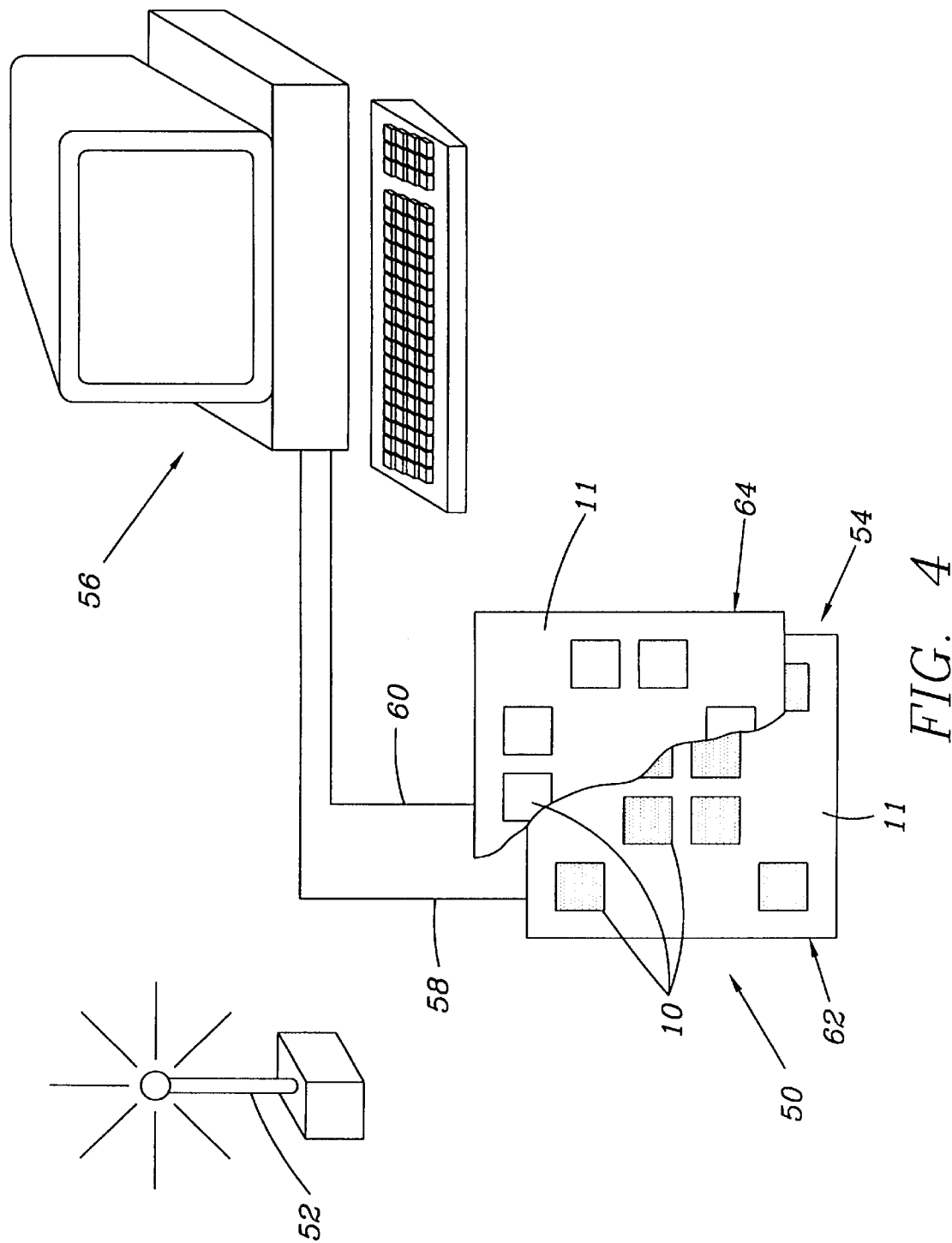
FIG. 4 is a perspective view diagrammatically illustrating a position tracking system embodying the present invention.

Turn now to FIG. 4 which illustrates a position tracking system 50 embodying the present invention. It comprises a suitable transmitter 52 at one location for producing a signal intended to be directed at an array system 54 of plural ultrasonic transducers 10 at another location arranged in a grid pattern at a plurality of respective discrete locations. The plural ultrasonic transducers 10 are of the construction described above and are responsive to the signal from the transmitter 52 to produce plural reactive signals corresponding to the signal as received at each respective ultrasonic transducer. A computer 56 receives the reactive signals via appropriate leads 58, 60 is responsive to said reactive signals from the various ultrasonic transducers 10 and is programmed to continuously determine the position of the array system as it moves through space. The array system 54 may be attached to a pilot's helmet as suggested in earlier cited U.S. Pat. No. 5,495,427 or to any other mobile platform for which location and orientation information is desired.

Figure 5:
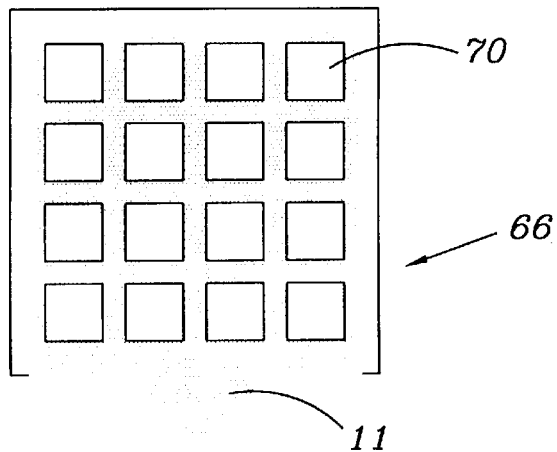
FIG. 5 is plan view of a first unit being a micro-machined pressure transducer ganged array comprising selected components from the structure illustrated in FIGS. 1–3.
Figure 6:
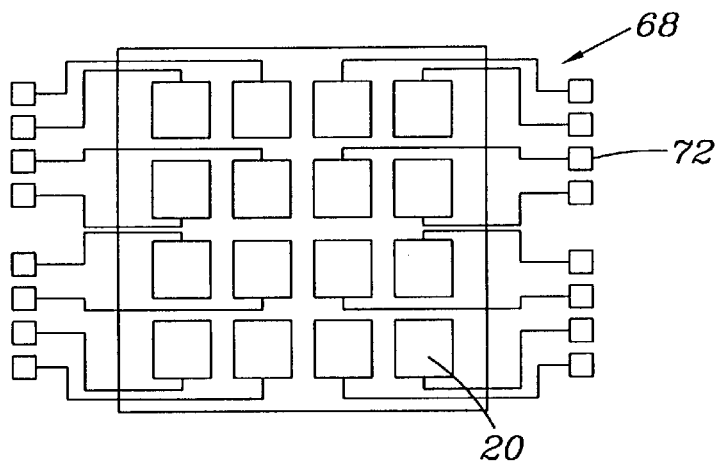
FIG. 6 is plan view of a second unit being, for example, a 4×4 silicon deformable mirror array also comprising selected components from the structure illustrated in FIGS. 1–3.

The array system 54 includes first and second spaced arrays 62, 64 of the plural ultrasonic transducers 10 at a second location, each set of the arrays being arranged in a grid pattern at a plurality of respective discrete locations. Each array 62, 64 is a combination of a first unit 66 (FIG. 5) being a micro-machined pressure transducer ganged array and of a second unit 68 being, for example, a 4×4 silicon deformable mirror array. As illustrated in FIG. 5, by way of example, the first unit 66 is comprised of a 4×4 grid of electrode sets 70, each electrode set 70 being the sum of all the individual electrodes 17 on the backplate 11 of a single transducer 10 (see especially FIG. 2). As seen in FIGS. 2 and 5, the grid of electrode sets 70 are suitably mounted on the common backplate 11 in an appropriate configuration.

Figure 7:
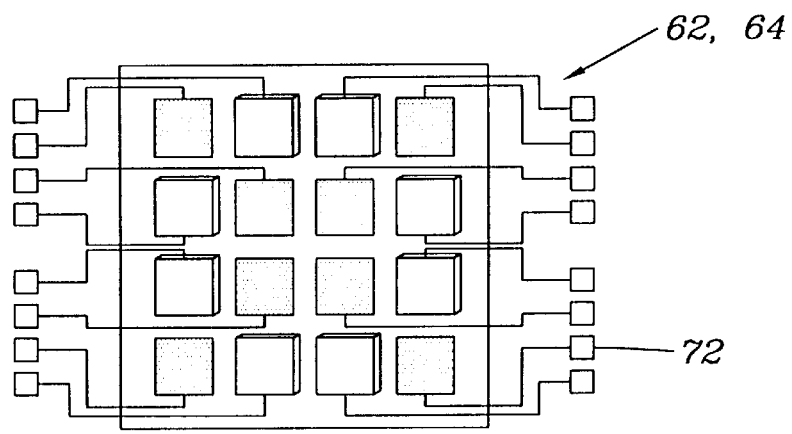
FIG. 7 is a perspective view illustrating an array system of transducers embodying the present invention and comprising a structure combining the structures of FIGS. 4 and 5.

The second unit 68 comprises a 4×4 grid of deformable mirror elements 20, each mounted on an associated doped silicon diaphragm 18 as earlier described. A plurality of wire bond pads 72 for appropriate electrical continuity with the computer 56 are provided around the periphery of the second unit, each being lead connected to an associated diaphragm 18 It will be appreciated that when the first and second units 66, 68 are combined in the manner illustrated in FIG. 7, the arrays 62, 64 have complimenting pairs of electrode sets 70 and mirror elements 20. Thus, the ultrasonic transducers are physically separated and, more specifically, at least one of the ultrasonic transducers lies outside of the plane of the remainder of the ultrasonic transducers. More specifically still, with the array 62 overlying the array 64, electrode sets 70 and mirror elements 20 in the array 62 are offset in the x- and y-directions of an orthogonal system with respect to electrode sets 70 and mirror elements 20 in the array 64. Of course, the electrode sets 70 and mirror elements 20 in the array 62 are also offset in the z-direction with respect to electrode sets 70 and mirror elements 20 in the array 64.

In another manner of speaking, it may be said that a signal responsive device constructed according to the present invention and operating in a three dimensional system defined by mutually perpendicular x, y, and z coordinates comprises a plurality of n ultrasonic transducers 10 having a mirror layer 20 deposed on a deformable diaphragm layer 18, the plurality of n ultrasonic transducers being formed into an array system 54 and spaced from each other in x and y directions, selected ones of the plurality of ultrasonic transducers being formed into subarrays 62, 64 of n ultrasonic transducers.

While preferred embodiments of the invention have been disclosed in detail, it should be understood by those skilled in the art that various other modifications may be made to the illustrated embodiments without departing from the scope and spirit of the invention as described in the specification and defined in the appended.

What is claimed is:

1. A position tracking system operating in a two dimensional system defined by mutually perpendicular x and y coordinates, the position tracking system comprising:
    a transmitter positioned at a first location for producing a transmitter signal;
    a first array of ultrasonic transducers arranged in a first grid pattern;
    a second array of ultrasonic transducers arranged in a second grid pattern;
    the second array of ultrasonic transducers being offset from the first array of ultrasonic transducers in the x direction;
    said plural ultrasonic transducers being responsive to said transmitter signal to produce plural reactive signals corresponding to said transmitter signal as received at respective ones of said plural ultrasonic transducers; and
    a computer responsive to said reactive signals from said plural ultrasonic transducers for continuously determining the position of said first and second arrays.

2. The position tracking system of claim 1 wherein the second array is offset from the first array in both the x and y directions.

3. The position tracking system of claim 1 wherein the position tracking system operates in a three dimensional system defined by mutually perpendicular x, y and z coordinates and the second array is offset from the first array in the x, y and z directions.

4. The position tracking system of claim 1 wherein the first array comprises a plurality of ultrasonic transducers and the second array comprises a plurality of spatial light modulators.

5. The position tracking system of claim 1 wherein the first array is in generally spaced relation to the second array.

6. The position tracking system of claim 1 wherein the first grid pattern is identical to the second grid pattern.

7. A position tracking system as set forth in claim 1 wherein said ultrasonic transducers are physically separated.

8. A position tracking system as set forth in claim 1 wherein said first and second arrays are physically separated.

9. A signal responsive device comprising:
    an array system of plural ultrasonic transducers and spatial light modulators arranged in a grid pattern at a plurality of respective discrete locations, said plural ultrasonic transducers being responsive to an input signal to produce plural reactive signals corresponding to said input signal as received at respective ones of said plural ultrasonic transducers.

10. A position tracking system as set forth in claim 9 wherein said array system includes a common backplane; and
    wherein for each of said ultrasonic transducer, a spatial light modulator is mounted on said common backplane.

11. A signal responsive device operating in a two dimensional system defined by mutually perpendicular x and y, coordinates comprising:
    a plurality of n ultrasonic transducers having a mirror layer disposed on a deformable diaphragm layer, said plurality of ultrasonic transducers being formed into an array and spaced from each other in x and y directions, selected ones of said plurality of ultrasonic transducers being formed into subarrays of m ultrasonic transducers.

12. A signal responsive device operating in a three dimensional system defined by mutually perpendicular x, y, and z coordinates comprising:
    a plurality of n ultrasonic transducers having a mirror layer disposed on a deformable diaphragm layer, said plurality of n ultrasonic transducers being formed into an array and spaced from each other in x and y directions, selected ones of said plurality of ultrasonic transducers being formed into subarrays of m ultrasonic transducers.

* * * * *